March 28, 1939. J. M. MAHER 2,152,619
METHOD OF AND APPARATUS FOR PROVIDING FILTERED
WATER FOR POWER PURPOSES AND THE LIKE
Filed Nov. 18, 1938 3 Sheets-Sheet 1
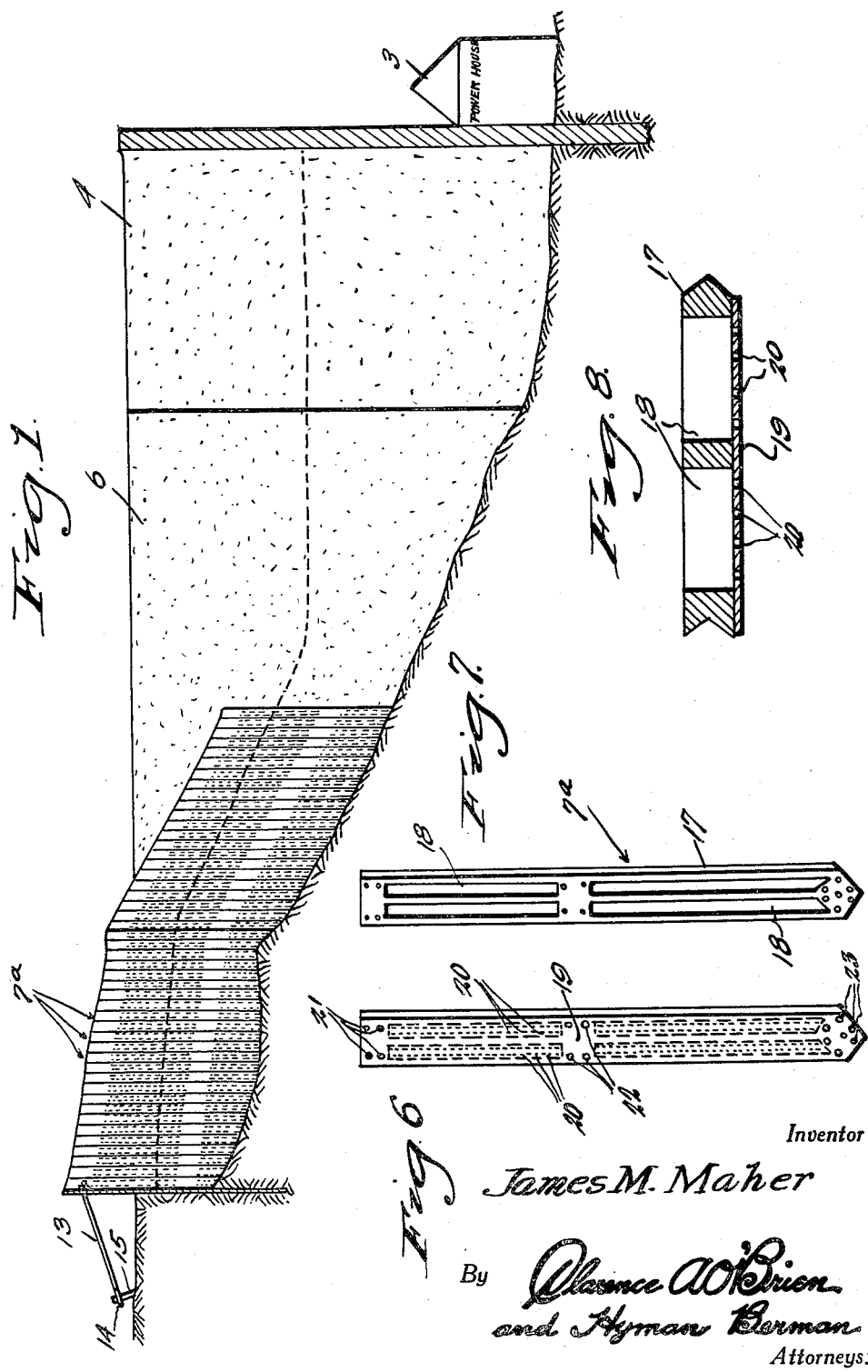
Inventor
James M. Maher March 28, 1939. J. M. MAHER 2,152,619
METHOD OF AND APPARATUS FOR PROVIDING FILTERED
WATER FOR POWER PURPOSES AND THE LIKE
Filed Nov. 18, 1938 3 Sheets-Sheet 2
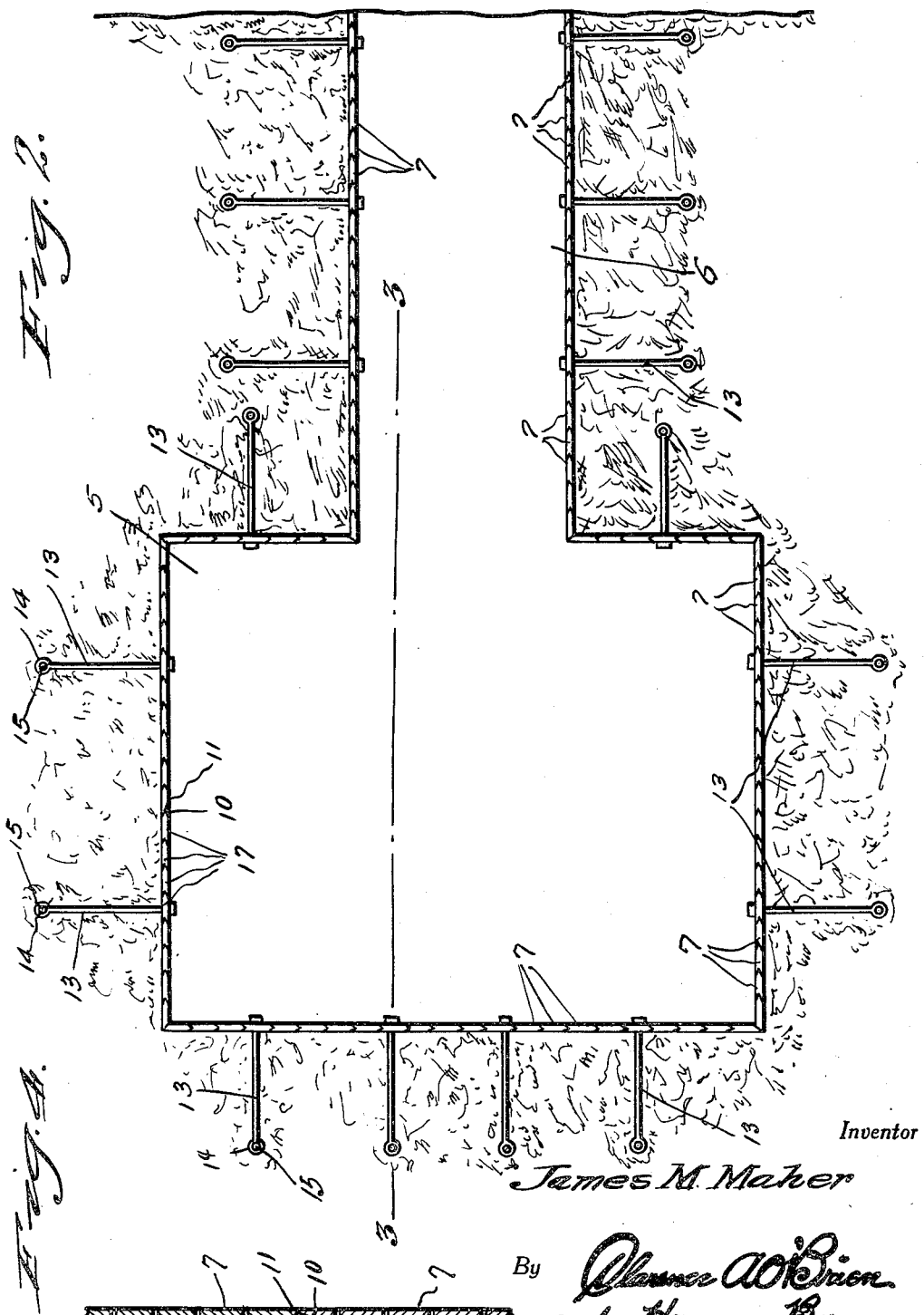
Inventor
James M. Maher
By Clarence A. O'Brien
and Hyman Berman
Attorneys March 28, 1939. J. M. MAHER 2,152,619
METHOD OF AND APPARATUS FOR PROVIDING FILTERED
WATER FOR POWER PURPOSES AND THE LIKE
Filed Nov. 18, 1938 3 Sheets-Sheet 3
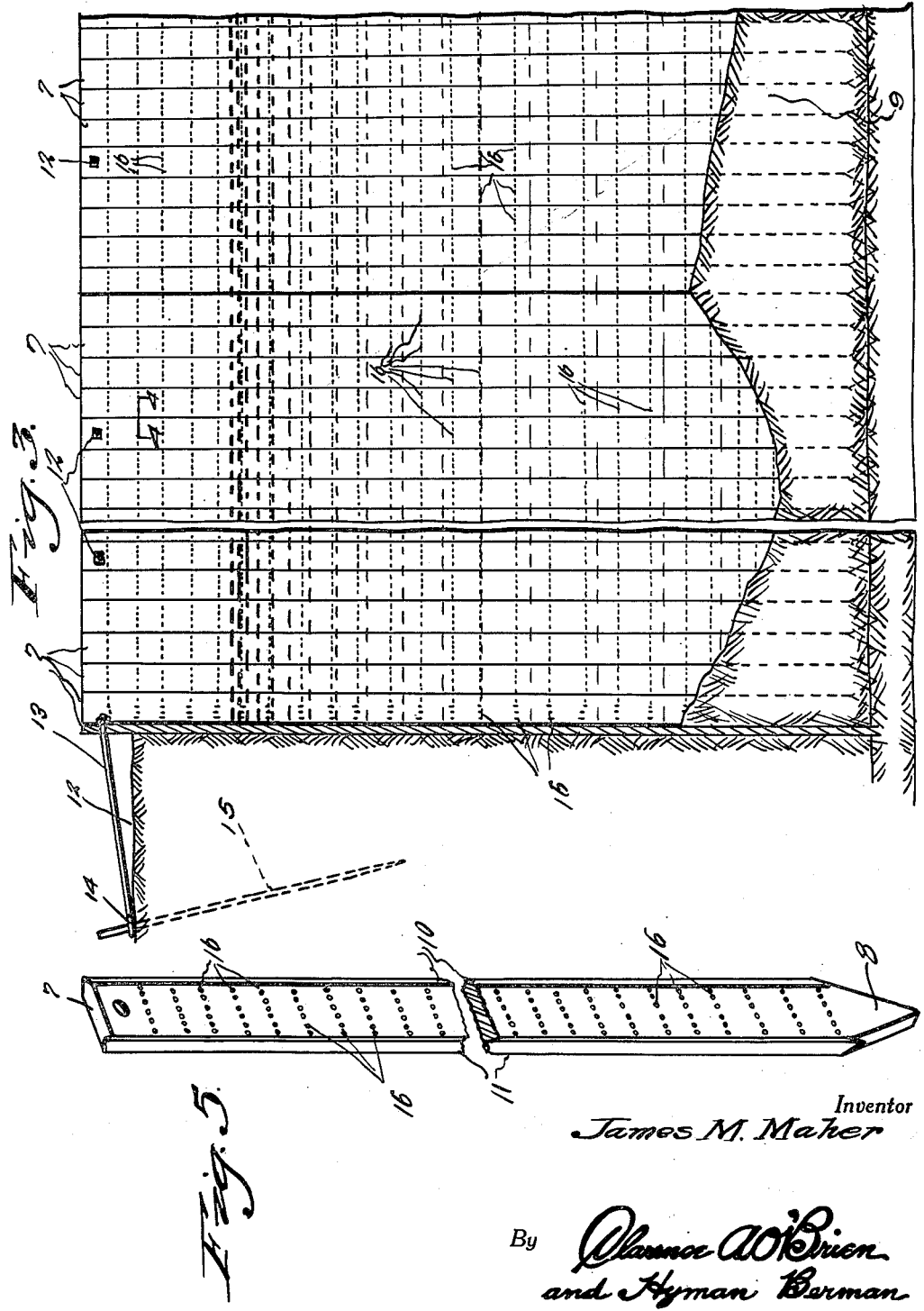
Inventor
James M. Maher
By Clarence A. O'Brien
and Hyman Berman
Attorneys Patented Mar. 28, 1939

2,152,619

UNITED STATES PATENT OFFICE 2,152,619

METHOD OF AND APPARATUS FOR PROVIDING FILTERED WATER FOR POWER PURPOSES AND THE LIKE

James M. Maher, Fremont, Nebr., assignor of one-half of one per cent to Gerard J. Reeson, ten per cent to Anna R. Daly, fourteen per cent to Cora E. Berhenke, and twenty-four per cent to John F. Mundy, all of Fremont, Nebr.

Application November 18, 1938, Serial No. 241,250

5 Claims. (Cl. 61—19)

This invention has reference to the provision of a substantially continuous supply of water for use in the development of hydro-electric power, and for the purpose of furnishing a substantially unlimited amount of filtered water for domestic or industrial purposes; and the invention together with its objects and advantages will be best understood from a study of the following description taken in connection with the accompanying drawings wherein:—

Figure 1 is a sectional view illustrating the manner in which my method for providing filtered water is carried out.

Figure 2 is a top plan view showing an artificial lake or basin and a portion of a canal leading downgrade therefrom.

Figure 3 is an enlarged sectional view taken substantially on the line 3—3 of Figure 2.

Figure 4 is a detail sectional view taken substantially on the line 4—4 of Figure 3.

Figure 5 is a perspective view of one form of piling provided in accordance with the invention.

Figure 6 is an elevational view of a second form of piling.

Figure 7 is a view similar to Figure 6 but with the perforated sheet metal plates removed from the piling.

Figure 8 is a transverse sectional view through the form of piling shown in Figure 6.

Referring more in detail to the drawings, it will be seen that 5 indicates generally an artificial lake or intake provided at the upper end of a canal 6 that, as shown in Figure 1, leads downgrade from the artificial lake 5 to a storage or impounding basin 4 where the water is elevated to the proper height for use in furnishing hydro-electric power or to be used for domestic or industrial purposes; there being in proximity to the impounding or storage basin 4 a power house 3 in which is located the mechanism for elevating the water in the storage or impounding basin 4.

The intake, or artificial lake 5, canal 6, and impounding or storage basin 4 are all dug to a depth reaching, as clearly suggested in Figure 2, the substrata of clay 9.

The intake, or artificial lake 5 and the canal 6, the latter for only a predetermined distance or portion of the length thereof, are walled up and to provide this walling for the intake or artificial lake 5 and the canal 6, I provide pilings of the type shown in Figure 3 and indicated by the reference numeral 7, or in Figures 6 to 8 inclusive and indicated by the reference numeral 7a, either type of piling being used as found desirable.

As shown in Figure 3, each piling 7 which is formed from metal, or other suitable material, is for substantially the full length thereof perforated as at 16, the perforations being arranged in vertically spaced transverse rows. Further the piling at one end thereof is sharpened to a point as at 8 so as to be readily driven into the ground.

The pilings are to be arranged in longitudinal edge-to-edge contact and to provide an efficient joint between the pilings, each piling at one longitudinal edge thereof is provided with a longitudinal groove 11 to receive a rib 10 on the adjacent longitudinal edge of the next adjacent piling, the groove 11 being preferably V-shaped in cross section and the tongue or rib 10 being also substantially V-shaped in cross section to fit conformably within the groove 11.

In the form of the invention shown in Figures 6 to 8, inclusive, the piling therein indicated by the reference numeral 7a comprises a body member 17 that is provided with upper and lower pairs of slots 18 elongated longitudinally as shown. Applied to at least one face of the body member 17 of the piling is a sheet 19 of metal, wire or the like to provide perforations 20, the plate 19 being riveted or otherwise secured to the body member 17 of the piling as at 21, 22, and 23, respectively.

By having the piling perforated as aforesaid, it will be seen that the subsurface water will filter through the perforations of the piling into the intake or artificial basin 5 free of all sand, silt, and other foreign substance.

This supply of water, being from the underflow of water which is below the surface of the soil, is practically unlimited.

The water thus supplied flows from the intake or artificial lake 5 through the canal 6 to the impounding or storage basin 4 where it is elevated through the medium of the mechanism within the power house 3 for use in producing hydro-electric power and for other domestic or industrial purposes.

It has been found that by having the walling formed by the piling extend from the intake or artificial basin 5 along opposite sides of the canal 6 for a portion of the length of the channel the subsurface water thus supplied to the intake or artificial basin 5 will, in volume, be sufficient to give it a perceptible force to carry this water downgrade through the canal and into the impounding or storage basin 4, the water by its own gravitation thus flowing from the basin 5 through the canal 6 to the impounding or storage basin 4, the water being thus stored or impounded being free of all sand, sediment, and other foreign matter.

Obviously, from the impounding or storage basin 4 the water is conducted through piping provided to the point of use.

It will also be apparent that by so providing filtered water in the manner contemplated by the present invention deposits of quicksand and silt in the headgate of water used for hydro-electric power are prevented.

This method of, and apparatus for providing filtered water will be found extremely useful along the Rocky Mountain slopes.

As shown, at intervals the pilings at the upper ends thereof have suitably secured thereto anchor rods 13. The anchor rods 13 are provided with eyes 14 which receive anchor stakes 15 driven into the ground as shown in Figure 2.

It is thought that a clear understanding of the invention, its utility and advantages, will be had without a further description thereof.

Having thus described the invention what is claimed as new is:

1. A method for producing filtered subsurface water for hydro-electric power and other purposes, said method consists of providing an intake or artificial lake basin, an impounding basin having the bottom thereof below the plane of the bottom of the intake lake-basin and a canal leading down-grade from the intake-basin to the impounding basin, both of said basins and said canal being dug to a depth reaching a substrata of clay, and walling said intake lake-basin and opposed walls of the channel from the intake lake-basin to a point materially removed from said intake lake-basin with perforated piling to permit the filtering of subsurface water into said intake lake-basin.

2. A method for providing filtered subsurface water for hydro-electric power and analogous purposes which consist in providing an intake lake-basin, an impounding basin, and a canal connecting said basin with the bottom of the canal being on a grade leading downwardly from the intake to the impounding basin, and lining the intake basin and a portion of the canal with wall-forming perforated piling through which the subsurface water filters into the intake basin.

3. In combination with an artificial lake-basin, impounding basin, and canal connecting said basins, a walling for said artificial lake basin and opposite walls of the canal from the intake end of the canal to a point materially removed from said end of the canal, said walling consisting of pilings arranged in longitudinal edge-to-edge contact, said pilings being perforated.

4. In combination with an artificial lake-basin, impounding basin, and canal connecting said basins, a walling for said artificial lake-basin and opposite walls of the canal from the intake end of the canal to a point materially removed from said end of the canal, said walling consisting of pilings arranged in longitudinal edge-to-edge contact, each piling having on one longitudinal edge thereof a longitudinal groove and an opposite edge thereof a longitudinal rib for fitting into the groove of the next adjacent piling, and said pilings being perforated.

5. In combination with an artificial lake-basin, impounding basin, and canal connecting said basins, a walling for said artificial lake-basin and opposite walls of the canal from the intake end of the canal to a point materially removed from said end of the canal, said walling consisting of pilings arranged in longitudinal edge-to-edge contact, each piling having on one longitudinal edge thereof a longitudinal groove and on an opposite edge thereof a longitudinal rib for fitting into the groove of the next adjacent piling, and each of said pilings also consisting of a body member provided with slots elongated longitudinally thereof and a perforated plate secured to one side of the body member.

JAMES M. MAHER.